US011651369B2

(12) United States Patent
Silvestre

(10) Patent No.: US 11,651,369 B2
(45) Date of Patent: May 16, 2023

(54) REMOTE EMV PAYMENT APPLICATIONS

(71) Applicant: American Express Travel Related Services Company, Inc., New York, NY (US)

(72) Inventor: Carlos Silvestre, Hove (GB)

(73) Assignee: American Express Travel Related Services Company, Inc., New York, NY (US)

(*) Notice: Subject to any disclaimer, the term of this patent is extended or adjusted under 35 U.S.C. 154(b) by 372 days.

(21) Appl. No.: 16/033,845

(22) Filed: Jul. 12, 2018

(65) Prior Publication Data

US 2020/0019961 A1 Jan. 16, 2020

(51) Int. Cl.
*G06Q 20/40* (2012.01)
*G06Q 20/20* (2012.01)
*G06Q 20/32* (2012.01)

(52) U.S. Cl.
CPC ......... *G06Q 20/401* (2013.01); *G06Q 20/20* (2013.01); *G06Q 20/3278* (2013.01)

(58) Field of Classification Search
CPC .. G06Q 20/40; G06Q 20/401; G06Q 20/3278; G06Q 20/322; G06Q 20/3221;
(Continued)

(56) References Cited

U.S. PATENT DOCUMENTS 9,396,469 B1 * 7/2016 Takayama ............. G06Q 20/06
10,467,615 B1 * 11/2019 Omojola ............ G06Q 30/0637
(Continued)

FOREIGN PATENT DOCUMENTS

JP 2001512863 8/2001
JP 2001512863 A 8/2001
(Continued)

OTHER PUBLICATIONS

PCT/US 19/36490 International Search Report; Outgoing Written Opinion of the ISA; Examiner's Search Strategy and Results. Aug. 30, 2019. (Year: 2019).*
(Continued)

*Primary Examiner* — James D Nigh
*Assistant Examiner* — Jeffrey L Licitra
(74) *Attorney, Agent, or Firm* — Thomas | Horstemeyer LLP

(57) ABSTRACT

Systems and methods for transactions using remote EMV payment applications are disclosed. The system may enable EMV transactions to be completed using EMV payment applications stored in a remote server. The remote EMV payment application may directly communicate EMV transaction data to the issuer system to complete transactions. The system may receive a transaction request comprising a payment token and an EMV payment application uniform resource identifier ("URI"). The system may invoke from a payment application server a remote EMV payment application based on the EMV payment application URI, wherein in response to being invoked, the remote EMV payment application is configured to interact with a merchant system kernel to process the transaction request, and wherein in response to processing the transaction request the remote EMV payment application is configured to transmit a transaction authorization request comprising EMV transaction data directly to the issuer system.

16 Claims, 5 Drawing Sheets

(58) Field of Classification Search
CPC .......... G06Q 20/3223; G06Q 20/3226; G06Q 20/3227; G06Q 20/325; G06Q 20/326; G06Q 20/08; G06Q 20/085; G06Q 20/20
USPC .......................................................... 705/75
See application file for complete search history.

(56) References Cited

U.S. PATENT DOCUMENTS

| | | | | |
|---|---|---|---|---|
| 10,546,290 | B2* | 1/2020 | Khan | G06Q 20/32 |
| 2006/0165060 | A1* | 7/2006 | Dua | G06Q 20/401 |
| | | | | 370/352 |
| 2010/0145860 | A1* | 6/2010 | Pelegero | G06Q 20/12 |
| | | | | 705/71 |
| 2011/0179113 | A1* | 7/2011 | Thomas | G06Q 20/0655 |
| | | | | 709/203 |
| 2012/0303483 | A1* | 11/2012 | Lee | G06Q 20/3278 |
| | | | | 705/26.41 |
| 2013/0024223 | A1* | 1/2013 | Thomas | G06Q 20/322 |
| | | | | 705/14.27 |
| 2013/0080273 | A1* | 3/2013 | Royyuru | G06Q 40/02 |
| | | | | 705/16 |
| 2013/0191289 | A1* | 7/2013 | Cronic | G06Q 20/40 |
| | | | | 705/67 |
| 2013/0238456 | A1* | 9/2013 | Soysa | G06Q 20/3223 |
| | | | | 705/21 |
| 2014/0040139 | A1* | 2/2014 | Brudnicki | H04W 12/0471 |
| | | | | 705/44 |
| 2014/0207682 | A1* | 7/2014 | Wolfond | G06Q 20/3276 |
| | | | | 705/44 |
| 2015/0106217 | A1* | 4/2015 | Radu | G06Q 20/3227 |
| | | | | 705/21 |
| 2015/0363774 | A1* | 12/2015 | Priebatsch | G06Q 20/38215 |
| | | | | 705/75 |
| 2016/0092878 | A1* | 3/2016 | Radu | G06Q 20/4012 |
| | | | | 705/72 |
| 2016/0260117 | A1* | 9/2016 | Yen | H04W 4/60 |
| 2017/0178124 | A1* | 6/2017 | Havilio | G06Q 20/3674 |
| 2017/0243199 | A1* | 8/2017 | Kalgi | G06Q 20/325 |
| 2017/0270511 | A1* | 9/2017 | Lindeman | G06Q 20/32 |
| 2018/0018665 | A1* | 1/2018 | Chene | G06Q 20/401 |
| 2021/0019755 | A1* | 1/2021 | Omojola | G06Q 20/40 |

FOREIGN PATENT DOCUMENTS

| | | | |
|---|---|---|---|
| JP | 2002109397 | | 4/2002 |
| JP | 2002109397 | A | 4/2002 |
| JP | 2010134884 | | 6/2010 |
| JP | 2010134884 | A | 6/2010 |
| WO | 9907121 | A9 | 4/1999 |
| WO | WO-2017097704 | A1 * | 6/2017 .......... G06Q 20/027 |

OTHER PUBLICATIONS

Rankl, Wolfgang and Effing, Wolfgang., Smart Card Handbook, 2010. Wiley. 4th Ed. Ch. 18 Smart Cards in Payment Systems. (Year: 2010).*

EMV Contactless Specifications for Payment Systems. Book B: Entry Point Specification. Version 2.6, Jul. 2016. Ch. 3 § 3.3 (available at https://www.emvco.com/wp-content/uploads/2017/05/BookB_Entry_Point_Specification_v2_6_20160809023257319.pdf) (Year: 2016).*

Internet Engineering Task Force ("IETF") draft for "The 'payto' URI scheme for payments." Published Apr. 7, 2018. available at https://datatracker.ietf.org/doc/pdf/draft-dold-payto-01 (Year: 2018).*

P. Urien and X. Aghina, "Secure Mobile Payments Based on Cloud Services: Concepts and Experiments," 2016 IEEE 2nd International Conference on Big Data Security on Cloud (BigDataSecurity), 2016, pp. 334, 333-338, doi: 10.1109/BigDataSecurity-HPSC-IDS. 2016.48. (Year: 2016).*

Note of Reason for Refusal in JP2020567540, dated Jan. 26, 2022, 8 pages.

First Office Action in Application No. 2020-567540 dated Jan. 26, 2022.

* cited by examiner

REMOTE EMV PAYMENT APPLICATIONS

FIELD

The disclosure generally relates to financial transactions, and more specifically, to a transaction system using remote EMV payment applications.

BACKGROUND

Credit cards, charge cards, debit cards, and other transaction instruments may be commonly accepted today as a form of payment to a merchant under a variety of circumstances. Payments may be completed using EMV protocols designed to authenticate chip-card transactions. For example, an EMV compatible transaction instrument may comprise an embedded microprocessor chip configured to store and protect cardholder data using dynamic authentication capabilities. The embedded microprocessor chip may comprise a payment application configured to interact with a merchant kernel to exchange data and authorize transactions. At least partially due to the payment application being stored in the embedded microprocessor chip of the EMV transaction instrument, communication protocols between the transaction instrument, the merchant system, and/or back-end issuer systems may be limited.

SUMMARY

Systems, methods, and articles of manufacture (collectively, the "system") for remote EMV payment applications are disclosed. The system may receive a transaction request comprising a payment token and an EMV payment application uniform resource identifier ("URI"). The system may invoke from a payment application server a remote EMV payment application based on the EMV payment application URI, wherein in response to being invoked, the remote EMV payment application is configured to interact with a merchant system kernel to process the transaction request, and wherein in response to processing the transaction request the remote EMV payment application is configured to transmit a transaction authorization request comprising EMV transaction data directly to an issuer system. The system may receive a transaction authorization notice from the issuer system, wherein the transaction authorization notice is based on the transaction authorization request generated by the remote EMV payment application.

In various embodiments, the transaction request may be generated by a merchant application in response to a user device initiating a transaction on the merchant application. The transaction request may also be generated by a merchant point of sale ("PoS") in response to a payment instrument interfacing with the merchant PoS. The payment instrument may comprise a local EMV payment application and the merchant PoS may comprise a merchant PoS kernel. The local EMV payment application is configured to interact with the merchant PoS kernel to initiate the transaction.

In various embodiments, the system may also transmit a transaction data request (e.g., for a user signature, PIN input, biometric input, etc.) in response to the remote EMV payment application determining that additional data is needed to authorize the transaction request. The system may also transmit to a payment network a transaction authorization request comprising the payment token, wherein in response to receiving the transaction authorization request, the payment network is configured to authorize and/or settle the transaction. The remote EMV payment application is configured to process the transaction request by generating a payment cryptogram to be transmitted to the issuer system to authorize the transaction request.

In various embodiments, the system may receive a transaction request comprising a payment token and an EMV payment application uniform resource identifier ("URI"). The system may invoke from a payment application server a remote EMV payment application based on the EMV payment application URI, wherein in response to being invoked, the remote EMV payment application is configured to interact with a merchant system kernel to process the transaction request. In response to processing the transaction request, the remote EMV payment application may be configured to transmit EMV transaction data comprising the payment token to an issuer system. The system may transmit a transaction authorization request to the issuer system. The issuer system may be configured to combine the EMV transaction data and the transaction authorization request to authorize the transaction. The system may receive a transaction authorization notice based on the interaction of the remote EMV payment application with the merchant system kernel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
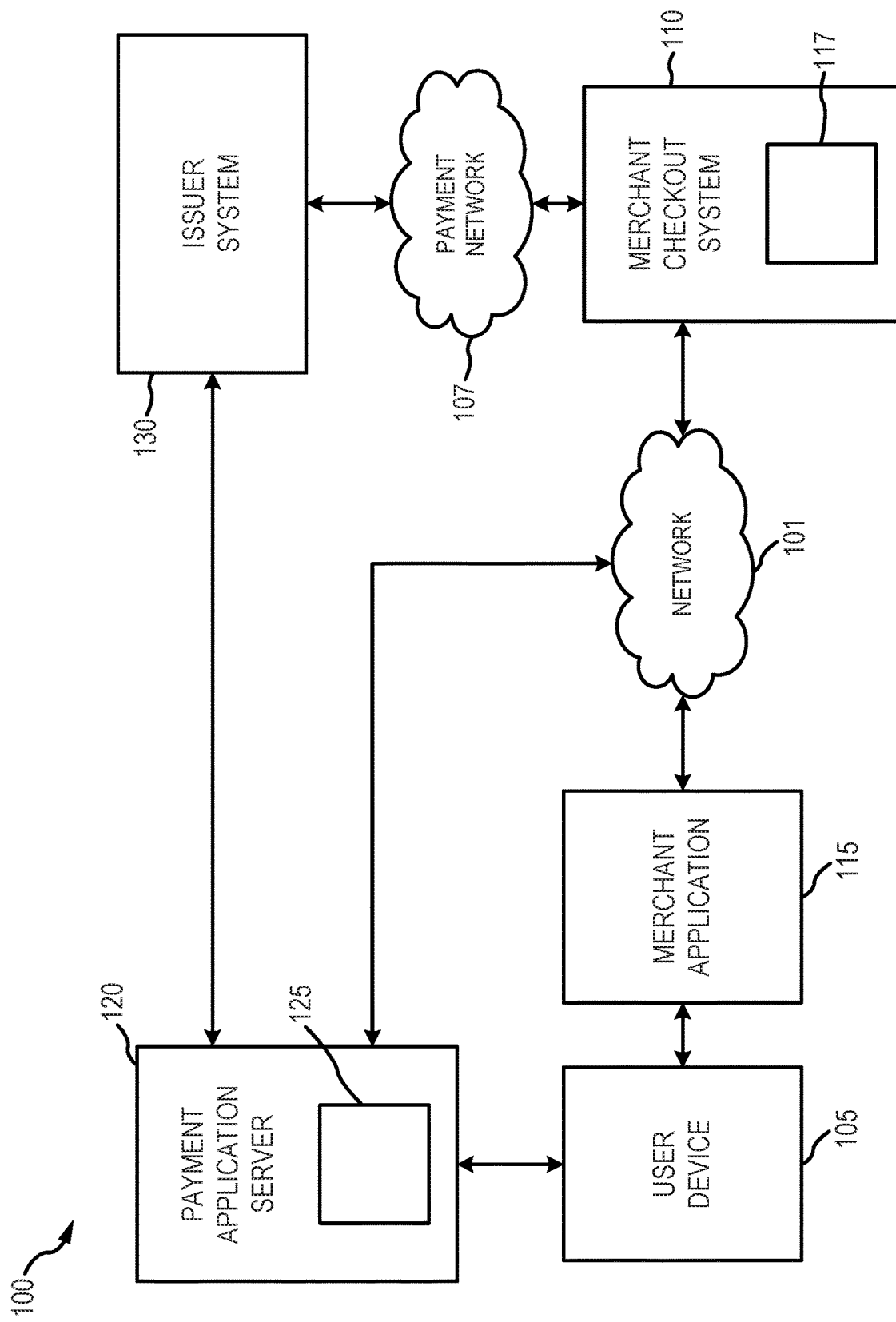
FIG. 1 is a block diagram illustrating various system components of a system for remote EMV payment applications to complete transactions from a user device, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In various embodiments, systems, methods, and articles of manufacture (collectively, the "system") for transactions using remote EMV payment applications are disclosed. In contrast to typical EMV ("EUROPAY®, MASTERCARD®, and VISA®") transaction systems having payment applications stored locally in a microchip on the financial instrument, the system disclosed herein enables EMV transactions to be completed using EMV payment applications stored in a server (e.g., a remote server, cloud-based server, etc.). In that regard, the system may allow for functional EMV capabilities to be used across different communication protocols, including TCP/IP. For example, TCP/IP communications may be enabled between a kernel (e.g., payment software) in a merchant system and the payment application in an issuer server. The system may therefore provide a similar level of security found in EMV chip-card transactions (e.g., using cryptographic validation of a cryptogram generated by the payment application and validated by an issuer system) with increased speed and efficiency by executing the payment application in a remote server. Moreover, the system may also allow transactions from various technologies and sources to be processed such as, for example, from in-store payments (e.g., using a contact interface, a contactless interface, a wireless connection, a Bluetooth connection, etc.), remote payments or payments using a mobile device, credit card, debit card, transaction instrument, Internet of Things (IoT) device, and/or the like.

The system further improves the functioning of the computer and the payment network. For example, by placing the EMV payment applications in a server (e.g., payment application server 120) instead of in a microchip on a physical payment instrument (e.g., credit card, debit card, etc.), the speed and efficiency of processing EMV payment transactions may be increased compared to typical EMV payment transactions. In typical embedded microchips, payment applications may be limited by low hardware resources (e.g., RAM memory and CPU), whereas by placing the payment applications in a server, where greater resources may be available, the payment application me be enabled to perform more complex tasks and operations, thus allowing for sophisticated features such as loyalty and rewards points to be integrated within the payment application. Moreover, payment applications stored in embedded microchips may become outdated in terms of payment features and functionalities, security functionalities and algorithms, and the like, given the typical expiration date of a physical payment instrument is five years. In comparison, payment applications stored in a server may be updated as frequently as desired without being controlled by expiration dates and reissuance of physical payment instruments.

In various embodiments, a system 100 for remote EMV payment applications is disclosed. System 100 may comprise one or more of a user device 105, a merchant checkout system 110, a payment application server 120, and/or an issuer system 130. The various components of system 100 may be interconnected via a network 101 and/or a payment network 107, as discussed further herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, user device 105 may be configured to initiate transactions with merchant checkout system 110 via merchant application 115, as discussed further herein. For example, a transaction account user, holder, beneficiary, or the like (collectively, the "user") may desire to purchase a physical or digital good, service, or the like by browsing merchant application 115. As discussed further herein, the user may interact with merchant application 115, via user device 105 to initiate, authorize, and complete one or more transactions. User device 105 may comprise any suitable hardware, software, and/or database components capable of sending, receiving, and storing data. For example, user device 105 may comprise a personal computer, personal digital assistant, cellular phone, smartphone (e.g., IPHONE®, BLACKBERRY®, and/or the like), Internet of Things (IoT) device, kiosk, and/or the like. User device 105 may comprise an operating system, such as, for example, a WINDOWS® mobile operating system, an ANDROID® operating system, APPLE® IOS®, a BLACKBERRY® operating system, and the like. User device 105 may comprise software components installed on user device 105 and configured to allow a user, via user device 105, access to merchant application 115. For example, user device 105 may comprise a web browser (e.g., MICROSOFT INTERNET EXPLORER®, GOOGLE CHROME®, etc.), an application, a micro-app or mobile application, or the like, configured to allow a user to access and interact with merchant application 115.

User device 105 may be in electronic and/or operative communication with a merchant application 115. Merchant application 115 may comprise software, a mobile application, a web interface, or the like accessible from user device 105. Merchant application 115 may allow the user, via user device 105, to browse, interact with, and purchase physical goods, digital goods, services, or the like from one or more merchants. In various embodiments, merchant application 115 may be in electronic and/or operative communication with merchant checkout system 110, via network 101. In various embodiments, merchant application 115 may be hosted on merchant checkout system 110 and accessible via user device 105. In that regard, user device 105 may also be in electronic communication with merchant checkout system 110, via network 101. In accordance with various embodiments, user device 105 and/or merchant application 115, via user device 105, may be configured to communicate with merchant checkout system 110 using TCP/IP, Bluetooth, and/or any other suitable communication protocol.

In various embodiments, user device 105 may also be authenticated by payment application server 120 prior to completing a transaction in system 100. For example, user device 105 may be authenticated using a one-time password, multi-factor authentication, and/or using any other suitable type of authentication.

Network 101 may comprise any suitable type of network capable of enabling communications between one or more of user device 105, merchant application 115, merchant checkout system 110, and/or payment application server 120. As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, merchant checkout system 110 may be configured to conduct transactions with users via merchant application 115. Merchant checkout system 110 may comprise any suitable combination of hardware, software, and/or database components. For example, merchant checkout system 110 may comprise one or more network environments, servers, computer-based systems, processors, databases, and/or the like. In various embodiments, merchant checkout system 110 may be computer based, and may comprise a processor, a tangible non-transitory computer-readable memory, and/or a network interface, along with other suitable system software and hardware components. Instructions stored on the tangible non-transitory memory may allow merchant checkout system 110 to perform various functions, as described herein. In various embodiments, merchant checkout system 110 may be in electronic and/or logical communication with user device 105, merchant application 115, and/or payment application server 120, via network 101. In accordance with various embodiments, merchant checkout system 110 may be configured to communicate with user device 105, merchant application 115, and/or payment application server 120 using TCP/IP, Bluetooth, and/or any other suitable communication protocol. Merchant checkout system 110 may also be in electronic communication with payment network 107 and/or issuer system 130.

In various embodiments, merchant checkout system 110 may comprise various components configured to aid in conducting transactions with users. For example, merchant checkout system 110 may comprise any suitable number of back-end systems to provide item inventory, transaction processing, item shipment and/or delivery, and/or the like. In various embodiments, merchant checkout system 110 may comprise a merchant system kernel 117. Merchant system kernel 117 may comprise any combination of hardware and/or software. For example, merchant system kernel 117 may comprise an EMV kernel. Merchant system kernel 117 may comprise a set of functions that provide processing logic and data needed to perform an EMV transaction. In that regard, merchant system kernel 117 may be configured to interact with EMV payment application 125 during a transaction, as discussed further herein. Merchant system kernel 117 may be invoked by merchant checkout system 110 in response to merchant checkout system 110 receiving a transaction request. Merchant system kernel 117 may be configured to perform data exchanges with EMV payment application 125, via payment application server 120 (e.g., to complete transactions). In that regard, and in accordance with various embodiments, an instance of merchant system kernel 117 may be initiated for each transaction completed in system 100.

In various embodiments, payment application server 120 may be configured to store, maintain, and execute one or more EMV payment applications 125. Payment application server 120 may comprise one or more of hardware, software, and/or database components. For example, payment application server 120 may comprise one or more network environments, servers, computer-based systems, processors, databases, and/or the like. In various embodiments, payment application server 120 may be computer based, and may comprise a processor, a tangible non-transitory computer-readable memory, and/or a network interface, along with other suitable system software and hardware components. Instructions stored on the tangible non-transitory memory may allow payment application server 120 to perform various functions, as described herein. Payment application server 120 may be in electronic and/or logical communication with user device 105, issuer system 130, and/or merchant checkout system 110, via network 101.

In various embodiments, each EMV payment application 125 may comprise software applications configured to process, authorize, and/or complete transaction requests. Each EMV payment application 125 may be configured to interact with merchant system kernel 117 to process, authorize, and/or complete transaction requests. For example, EMV payment application 125 may be configured to use asymmetric and/or symmetric cryptography to establish a cryptographically protected secure channel with the merchant system kernel 117 and/or to authenticate the merchant system kernel 117. EMV payment application 125 may also be configured to perform cardholder verification, process transaction restrictions, perform merchant risk analysis and management, perform card action analysis (e.g., first card action analysis, second card action analysis, etc.), process the transaction request, complete the transaction request, and/or the like. In various embodiments, each EMV payment application 125 may be specific to the issuer of the transaction account initiating the purchase (e.g., AMERICAN EXPRESS®, VISANET®, MASTERCARD®, etc.). In that regard, the EMV payment application 125 invoked during a transaction may be based on the issuer of the transaction account used in the transaction. For example, each EMV payment application 125 may correspond to a unique resource identifier (URI) serving as a unique identifier for each EMV payment application 125. In various embodiments, any portion of the EMV payment application 125 discussed herein may be remote and still operate similar to as disclosed herein. As such, some portions of the EMV payment application 125 may still be stored locally in a microchip of a transaction instrument.

In various embodiments, EMV payment application 125 may communicate directly with issuer system 130, as discussed further herein. For example, EMV payment application 125 may be configured to transmit a transaction authorization request comprising EMV transaction data directly to issuer system 130. EMV payment application 125 may also be configured to generate a cryptogram (e.g., a payment cryptogram) and transmit the cryptogram directly to issuer system 130, as discussed further herein. In that regard, in contrast to typical payment applications embedded in physical payment instruments, EMV payment application 125 may communicate EMV transaction data needed to complete and authorize the transaction directly to issuer system 130.

In various embodiments, payment network 107 may comprise or interact with a traditional account payment network to facilitate purchases and payments, authorize transactions, and/or settle transactions. Payment network 107 may comprise any suitable network capable of enabling communications between merchant checkout system 110 and issuer system 130. For example, payment network 107 may represent existing proprietary networks that presently accommodate transactions for credit cards, debit cards, and/or other types of transaction accounts or transaction instruments. Payment network 107 may be a closed network that is secure from eavesdroppers. In various embodiments, payment network 107 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network.

In various embodiments, issuer system 130 may be configured as a central hub to access various systems, engines, and components of payment network 107. For example, issuer system 130 may comprise a sub-network, computer-based system, software component, and/or the like configured to provide an access point to various systems, engines, and components in payment network 107. In various embodiments, issuer system 130 may also comprise a transaction account issuer's Credit Authorization System ("CAS") capable of authorizing transactions, as discussed further herein. Issuer system 130 may be in operative and/or electronic communication with payment application server 120 and/or payment network 107. Issuer system 130 may comprise one or more network environments, servers, computer-based systems, processors, databases, and/or the like. In various embodiments, issuer system 130 may be computer based, and may comprise a processor, a tangible non-transitory computer-readable memory, and/or a network interface, along with other suitable system software and hardware components. Instructions stored on the tangible non-transitory memory may allow issuer system 130 to perform various functions, as described herein.

In various embodiments, issuer system 130 may include systems and databases related to financial and/or transaction systems and processes, such as, for example, one or more authorization engines, authentication engines and databases, settlement engines and databases, accounts receivable systems and databases, accounts payable systems and databases, and/or the like. For example, issuer system 130 may be configured to authorize and settle payment transactions; maintain transaction account member databases, accounts receivable databases, accounts payable databases, etc.; and/or the like.

Figure 2:
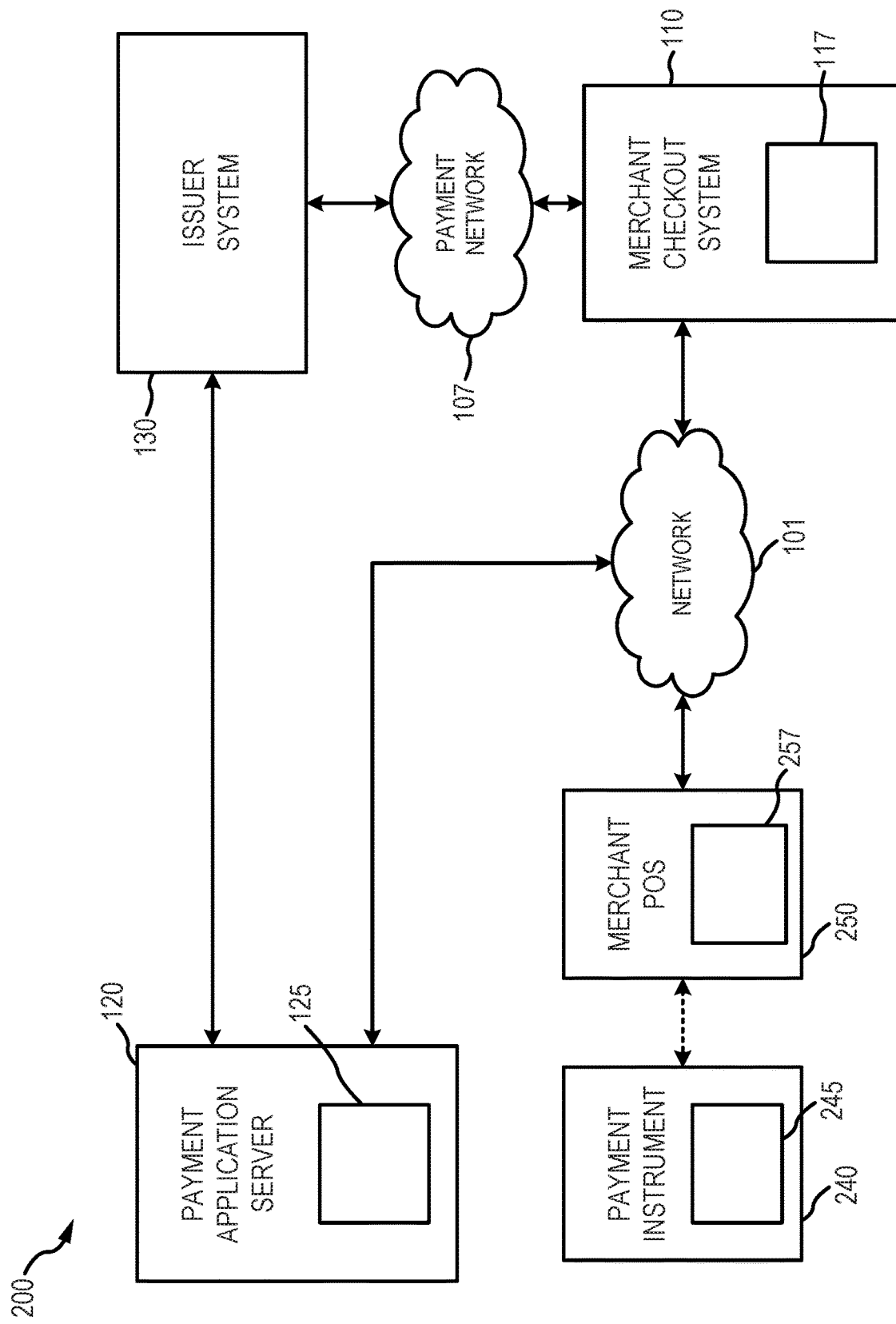
FIG. 2 is a block diagram illustrating various system components of a system for remote EMV payment applications to complete transactions from a payment instrument, in accordance with various embodiments.

In various embodiments, and with reference to FIG. 2, a system 200 for remote EMV payment applications to authorize transactions from a payment instrument are disclosed. System 200 may be similar to system 100, with brief reference to FIG. 1. System 200 may comprise a payment instrument 240 and/or a merchant point of sale 250.

In various embodiments, payment instrument 240 may comprise any suitable transaction instrument capable of initiating transactions using a contact interface (e.g., swiping a card, inserting an EMV-chip card, etc.) and/or a contactless interface (e.g., an NFC-enabled payment, etc.). For example, payment instrument 240 may comprise a credit card, debit card, multi-transaction account card, user device, Internet of Things (IoT) device, or the like. Payment instrument 240 may comprise a plurality of linked transaction accounts. For more information on payment instruments having a plurality of linked transaction accounts, see U.S. application Ser. No. 15/646,928 titled FUND TRANSFER SERVICE FOR MULTIPLE LINKED TRANSACTION ACCOUNTS and filed on Jul. 11, 2017, the contents of which are incorporated by reference in its entirety.

Payment instrument 240 may comprise one or more local EMV payment applications 245 corresponding to each transaction account linked to payment instrument 240. Local EMV payment application 245 may comprise a software application and may be similar to (remote) EMV payment application 125. Each local EMV payment application 245 may be configured to select the (remote) EMV payment application 125 needed to complete the transaction, based on the transaction account selected to be used for the transaction. For example, and as discussed further herein, local EMV payment application 245 may be configured to interact with merchant PoS kernel 257 to process data, prompt the user to select a transaction account to use for the transaction, determine the (remote) EMV payment application 125 to select based on the transaction account, generate a transaction request comprising at least a payment token and an EMV payment application URI corresponding to the selected (remote) EMV payment application 125, and/or the like.

In various embodiments, merchant point of sale (PoS) 250 may comprise a PoS terminal configured as a mechanism to conduct a transaction. For example, merchant PoS 250 may comprise a cashier station, a credit and/or debit card reader, an EMV card reader, and/or the like. Merchant PoS 250 may also comprise a near-field communication (NFC) terminal. In this regard, an NFC terminal may allow for the transfer of information (e.g., payment information, etc.) from a NFC enabling user device, such as, for example, a mobile device, a transaction instrument enabled for NFC payments, a watch, and/or the like. In response to a user initiating the transaction with merchant PoS 250 may generate a transaction authorization request, as discussed further herein. Merchant PoS 250 may be in electronic and/or logical communication with merchant checkout system 110, via network 101.

In various embodiments, merchant PoS 250 may comprise a merchant PoS kernel 257. Merchant PoS kernel 257 may be similar to merchant system kernel 117. Merchant PoS kernel 257 may comprise any combination of hardware and/or software. For example, merchant PoS kernel 257 may comprise an EMV kernel. Merchant PoS kernel 257 may comprise a set of functions that provide processing logic and data needed to perform an EMV transaction. For example, and as discussed further herein, merchant PoS kernel 257 may be configured to interact with local EMV payment application 245 to process data, prompt the user to select a transaction account to use for the transaction, determine the (remote) EMV payment application 125 to select based on the transaction account, generate a transaction request comprising at least a payment token and an EMV payment application URI corresponding to the selected (remote) EMV payment application 125, and/or the like.

Figure 3:
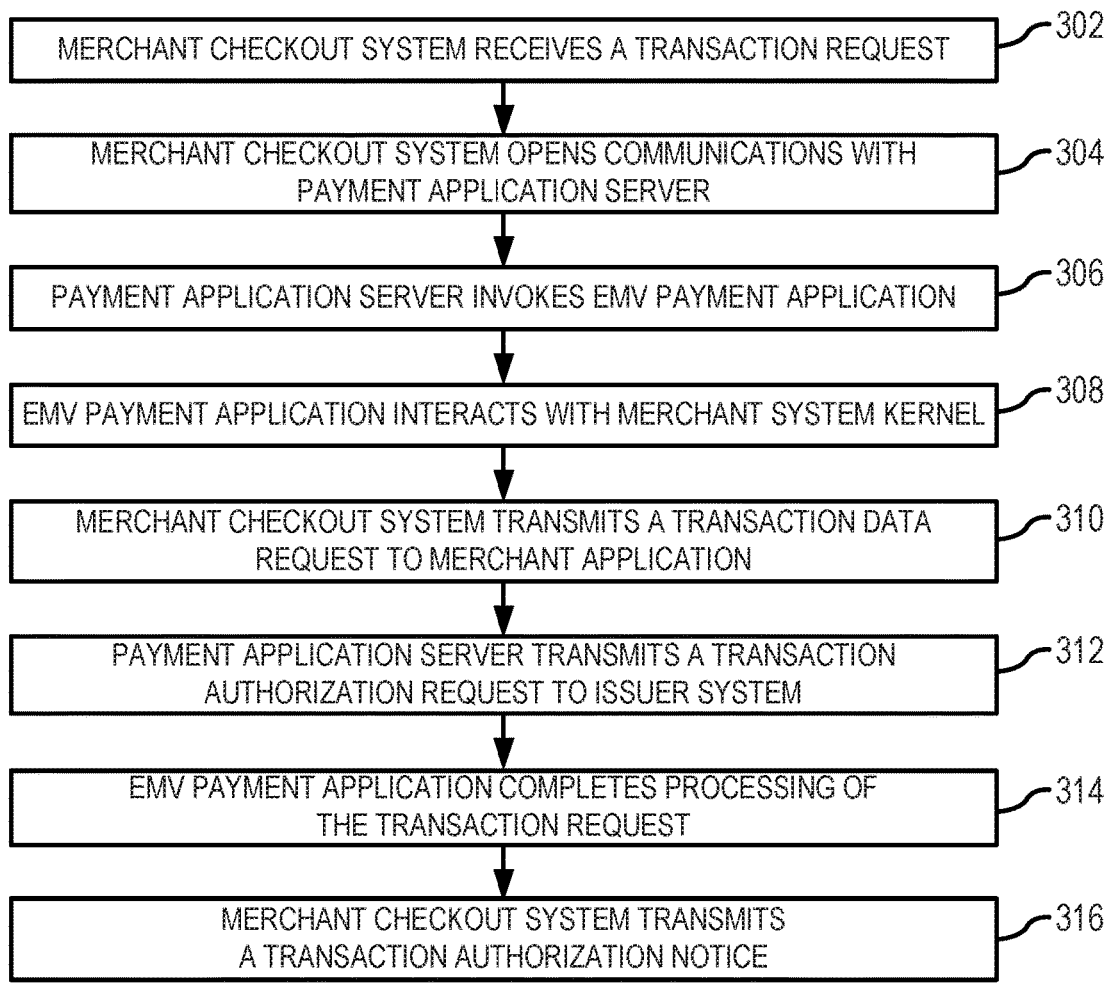
FIG. 3 illustrates a process flow for a method of conducting an EMV transaction using a remote EMV payment application, in accordance with various embodiments.
Figure 4:
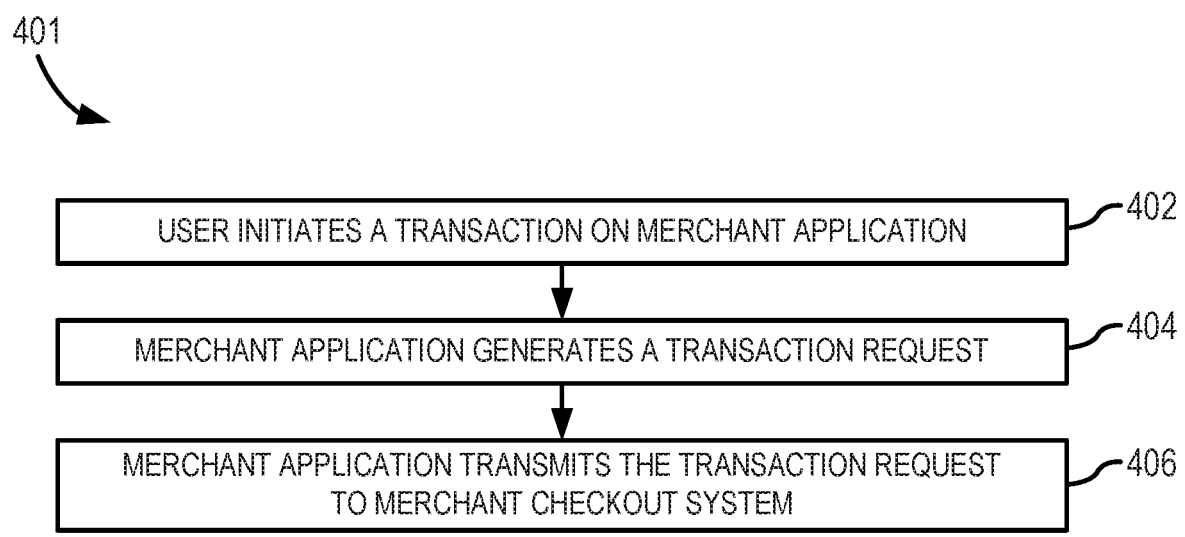
FIG. 4 illustrates a process flow for a method of initiating an EMV transaction using a user device, in accordance with various embodiments.
Figure 5:
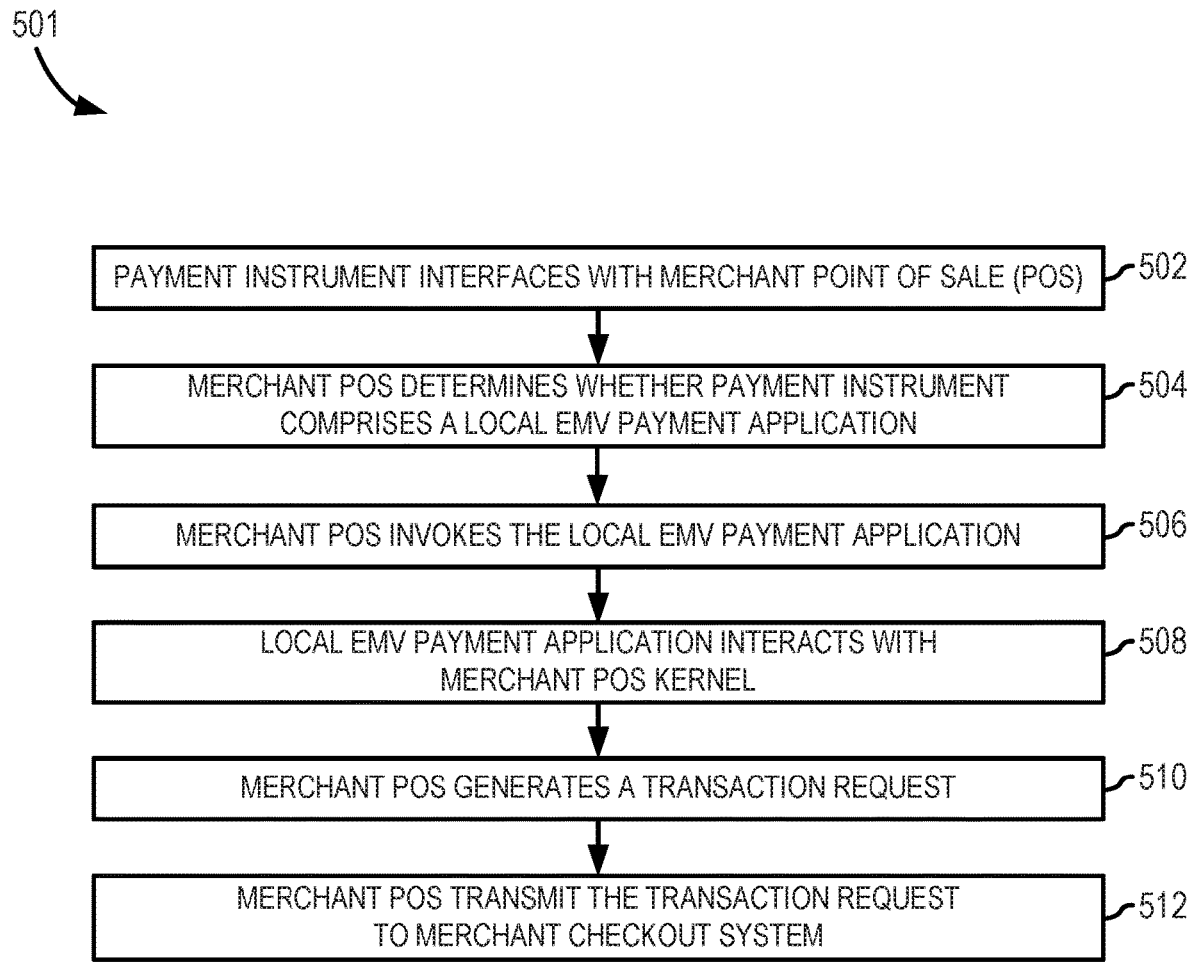
FIG. 5 illustrates a process flow for a method of initiating an EMV transaction using a payment instrument, in accordance with various embodiments.

Referring now to FIGS. 3-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIGS. 3-5, but also to the various system components as described above with reference to FIGS. 1 and 2. It should be understood that although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 3, a method 301 for conducting an EMV transaction using a remote EMV payment application is disclosed. Method 301 may enable EMV transactions to be initiated, authorized, and completed using remote EMV payment applications stored in a server (e.g., in contrast to EMV payment applications stored locally in a microchip of a transaction instrument). In various embodiments, merchant checkout system 110 receives a transaction request (step 302). Merchant checkout system 110 may receive the transaction request from various sources, including from transactions initiated by mobile devices, Internet of Things (IoT) devices, transaction instruments (e.g., credit cards, debit cards, etc.), or the like.

As an example, and with specific reference to FIGS. 4 and 1, a method 401 for initiating EMV transactions using a user device is disclosed, in accordance with various embodiments. A user initiates a transaction on merchant application 115 (step 402), via user device 105. For example, the user may browse merchant application 115, via user device 105, and may desire to purchase a good or service. The user may input data to initiate the transaction, such as a purchase selection, a payment method, a shipping method or a pickup method, and/or the like. Merchant application 115 generates a transaction request (step 404) based on user input. The transaction request may comprise any suitable data related to the transaction such as, for example, a payment token, a payment amount, a merchant ID, and/or the like. The payment token may comprise user identifying data such as a transaction account number and/or the like. The transaction request may comprise additional transaction identification information, which may be standardized codes or numbers indicating the characteristics of the transaction, such as, for example a merchant category code, a service establishment number, a geographic location code, a product code, and/or the like. In various embodiments, the transaction request may also comprise an EMV payment application uniform resource identifier (URI). The EMV payment application URI may comprise a unique identifier corresponding to one or more EMV payment applications 125 stored in payment application server 120. For example, the EMV payment application URI may comprise a string of characters identifying the storage location of the corresponding EMV payment application 125 in payment application server 120. Merchant application 115 transmits the transaction request to merchant checkout system 110 (step 406), via network 101. In various embodiments, merchant application 115 may be configured to transmit the transaction request using any suitable communications protocol, such as, for example TCP/IP, Bluetooth, or the like. In that respect, method 401 may enable the transmission of transaction data without using ISO/IEC 7816 and/or ISO/IEC 14443 communication protocols typically needed in EMV transactions.

As a further example, and with specific reference to FIGS. 5 and 2, a method 501 for initiating EMV transactions using a payment instrument is disclosed, in accordance with various embodiments. Payment instrument 240 interfaces with merchant point of sale ("PoS") 250 (step 502). For example, a user may desire to purchase goods or services from a merchant at merchant PoS 250. The user may use payment instrument 240 to initiate the transaction by swiping or inserting the payment instrument 240 into the merchant PoS 250 (e.g., a contact transaction), using a contactless interface (e.g., NFC, etc.), and/or the like. Merchant PoS 250 determines whether payment instrument 240 comprises a local EMV payment application 245 (step 504). For example, and in accordance with various embodiments, payment instrument 240 may comprise a plurality of linked transaction accounts. Payment instrument 240 may comprise a local EMV payment application 245 configured to enable selection of at least one of the plurality of linked transaction accounts during the transaction process.

Merchant PoS 250 invokes local EMV payment application 245 (step 506). For example, in response to payment instrument 240 interfacing with merchant PoS 250, local EMV payment application 245 interacts with merchant PoS kernel 257 (step 508). Local EMV payment application 245 and merchant PoS kernel 257 may determine one or more payment applications (corresponding to one or more transaction accounts linked to payment instrument 240) that are supported by both local EMV payment application 245 and merchant PoS kernel 257. Merchant PoS 250, based on the invoked local EMV payment application 245, may prompt the user to select the transaction account on payment instrument 240 that the user desires to use to complete the transaction. The user may interact with merchant PoS 250 to select the transaction account.

Merchant PoS 250 generates a transaction request (step 510) based on the interaction of local EMV payment application 245 with merchant PoS kernel 257. The transaction request may comprise any suitable data related to the transaction, such as, for example, a payment token, a payment amount, a merchant ID, or the like. The payment token may comprise user identifying data such as a transaction account number and/or the like. The transaction request may comprise additional transaction identification information, which may be standardized codes or numbers indicating the characteristics of the transaction, such as, for example a merchant category code, a service establishment number, a geographic location code, a product code, a PoS terminal number, and/or the like. In various embodiments, the transaction request may also comprise an EMV payment application uniform resource identifier (URI). The EMV payment application URI may comprise a unique identifier corresponding to one or more EMV payment applications 125 stored in payment application server 120. For example, the EMV payment application URI may comprise a string of characters identifying the storage location of the corresponding EMV payment application 125 in payment application server 120. Merchant PoS 250 transmits the transaction request to merchant checkout system 110 (step 512), via network 101. In various embodiments, merchant PoS 250 may be configured to transmit the transaction request using any suitable communications protocol, such as, for example TCP/IP, Bluetooth, or the like.

With reference again to FIG. 3, in response to receiving the transaction request (e.g., from step 406, with brief reference to FIG. 4, or from step 512, with brief reference to FIG. 5), merchant checkout system 110 opens communications with payment application server 120 (step 304), via network 101. For example, merchant checkout system 110 may establish and open communication with payment application server 120 by transmitting the payment token and the EMV payment application URI to payment application server 120. Payment application server 120 invokes EMV payment application 125 (step 306) based on the EMV payment application URI. EMV payment application 125 interacts with merchant system kernel 117 (step 308) to begin processing the transaction request. EMV payment application 125 may be configured to use asymmetric and/or symmetric cryptography to establish a cryptographically protected secure channel with merchant system kernel 117 and/or to authenticate merchant system kernel 117. For example, and in accordance with various embodiments, in an EMV 1st generation transaction, EMV payment application 125 may be configured perform data authentication of the transaction request. EMV payment application 125 may also be configured to perform cardholder verification, process transaction or account restrictions, perform merchant risk analysis and management, perform card action analysis (e.g., first card action analysis, second card action analysis, etc.), process the transaction request (online), complete the transaction request, and/or the like. In various embodiments, EMV payment application 125 may also be configured to generate EMV data, such as for example, a cryptogram that may transmitted to issuer system 130 and validated by issuer system 130 to authorize the transaction request.

In various embodiments, merchant checkout system 110 transmits a transaction data request (step 310). For example, in response to the EMV payment application 125 determining that additional information is needed to authorize the transaction request, EMV payment application 125 (and/or merchant system kernel 117) may generate the transaction data request and instruct merchant checkout system 110 to transmit the transaction data request. With brief reference to FIG. 1, and in accordance with various embodiments, merchant checkout system 110 may transmit the transaction data request to merchant application 115. With brief reference to FIG. 2, and in accordance with various embodiments, merchant checkout system 110 may transmit the transaction data request to merchant PoS 250. The transaction data request may comprise data requesting additional user input, such as, for example, a biometric input, a user PIN, a user signature, and/or the like. In response to receiving a transaction data response, merchant checkout system 110 (with brief reference to FIG. 1) or merchant PoS 250 (with brief reference to FIG. 2) may transmit the transaction data response to merchant checkout system 110, via network 101.

In various embodiments, payment application server 120 transmits a transaction authorization request to issuer system 130 (step 312). The transaction authorization request may comprise the payment token, and/or any other payment information. In various embodiments, the transaction authorization request may also comprise a cryptogram and other transaction data generated by EMV payment application 125. In that regard, payment application server 120 transmits the EMV transaction data needed to complete the transaction directly to issuer system 130 (in contrast to typical payment systems wherein the payment application is embedded in a physical transaction instrument). Issuer system 130, and/or payment network 107, may be configured to authorize, validate, and/or settle the transaction based on the transaction authorization request. For example, issuer system 130 may query an account member database and may compare the CSV/CVV codes, the ARQC, account holder identifying information, etc. against the values contained in the transaction authorization request. As a further example, issuer system 130 may be configured to validate the cryptogram generated by EMV payment application 125. Issuer system 130 may also update accounts receivable databases and settlement databases to reflect the transaction. In response to authorizing, validating, and/or settling the transaction authorization request, issuer system 130 may transmit a transaction authorization response to payment application server 120 and/or merchant checkout system 110. The transaction authorization response may comprise data indicating whether the transaction was successfully authorized, validated, and/or settled.

EMV payment application 125 completes processing of the transaction request (step 314) with merchant system kernel 117. Merchant checkout system 110 transmits a transaction authorization notice (step 316). For example, merchant checkout system 110 may transmit the transaction authorization notice to merchant application 115 (with brief reference to FIG. 1) or merchant PoS 250 (with brief reference to FIG. 2). The transaction authorization notice may comprise data indicating whether the transaction request was successfully authorized, funds were successfully transferred, and/or the like.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.3 or EMV 2nd generation available at http://www.emvco.com.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by AMERICAN EXPRESS®. Each company's account numbers comply with that company's standardized format such that the company using a fifteen-digit format will generally use three-spaced sets of numbers, as represented by the number "0000 000000 00000." The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution," "transaction account issuer," "issuer system," or the like may include any entity that offers transaction account services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant, or the like.

The terms "payment vehicle," "transaction account," "financial transaction instrument," "transaction instrument" and/or the plural form of these terms may be used interchangeably throughout to refer to a financial instrument. Phrases and terms similar to "transaction account" may include any account that may be used to facilitate a financial transaction.

In various embodiments, the system (e.g., user device 105) may integrate with one or more smart digital assistant technologies. For example, exemplary smart digital assistant technologies may include the ALEXA system developed by AMAZON®, GOOGLE HOME®, APPLE® HOMEPOD®, and/or the similar digital assistant technologies. AMAZON ALEXA, GOOGLE HOME®, and APPLE® HOMEPOD®, may all provide cloud-based voice services that can assist with tasks, entertainment, general information, and more.

All AMAZON® ALEXA devices, such as the AMAZON ECHO®, AMAZON ECHO DOT®, AMAZON TAP®, and AMAZON FIRE® TV, have access to the ALEXA system. The ALEXA, GOOGLE HOME®, and APPLE® HOMEPOD® systems may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA, GOOGLE HOME®, and APPLE® HOMEPOD® systems may allow the user to access information about eligible accounts linked to an online account across all ALEXA-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® EXCEL® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website or application; a social media site, application, or platform; affiliate or partner websites and applications; an external vendor, and a mobile device communication. Examples of social media sites, applications, and platforms may include FACEBOOK®, INSTAGRAM®, LINKEDIN®, PINTEREST®, QZONE®, SNAPCHAT®, TWITTER®, VKontakte (VK), and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM) or a programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (PoS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, "issue a debit," "debit" or "debiting" refers to either causing the debiting of a stored value or prepaid card-type financial account, or causing the charging of a credit or charge card-type financial account, as applicable.

Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the blockchain-based system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager such as, for example, Parallel Multithreaded Machine ("PM2"); a resource and performance monitoring tool such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3-5, the process flows and/or screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS' but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The disclosure and claims do not describe only a particular outcome of processing transactions using remote EMV payment applications, but the disclosure and claims include specific rules for implementing the outcome of processing transactions using remote EMV payment applications and that render information into a specific format that is then used and applied to create the desired results of processing transactions using remote EMV payment applications, as set forth in McRO, Inc. v. Bandai Namco Games America Inc. (Fed. Cir. case number 15-1080, Sep. 13, 2016). In other words, the outcome of processing transactions using remote EMV payment applications can be performed by many different types of rules and combinations of rules, and this disclosure includes various embodiments with specific rules. While the absence of complete preemption may not guarantee that a claim is eligible, the disclosure does not sufficiently preempt the field of processing transactions using remote EMV payment applications at all. The disclosure acts to narrow, confine, and otherwise tie down the disclosure so as not to cover the general abstract idea of just processing transactions using remote EMV payment applications. Significantly, other systems and methods exist for processing EMV transactions, so it would be inappropriate to assert that the claimed invention preempts the field or monopolizes the basic tools of processing EMV. In other words, the disclosure will not prevent others from processing transactions using remote EMV payment applications, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (e.g., via user device 105). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of facilitating a transaction between a mobile device and a processor, comprising:
   receiving, by the processor, a transaction request comprising a payment token and an EMV ("EUROPAY®, MASTERCARD®, and VISA®") payment application uniform resource identifier ("URI") from the mobile device, the EMV payment application URI comprising a string of characters identifying a storage location of the remote EMV payment application on a payment application server, and wherein the transaction request is initiated by a user input on a merchant application;
   invoking, by the processor in electronic communication with a payment application server, a remote EMV payment application based on the EMV payment application URI, the EMV payment application URI obtained from the mobile device, by sending the payment token and the EMV payment application URI to the payment application server;
   wherein in response to being invoked, the remote EMV payment application is configured to establish a cryptographically protected secure channel with a merchant system kernel to process the transaction request, and
   wherein in response to processing the transaction request the remote EMV payment application is configured to transmit a transaction authorization request comprising EMV transaction data directly to an issuer system, the EMV transaction data comprising a cryptogram for validation by the issuer system;
   receiving, by the processor, a transaction data request for additional information to authorize the transaction request, in response to a determination by the remote EMV payment application that additional information is required to authorize the transaction request;
   transmitting, by the processor, a transaction data request to the mobile device, including a request for additional information;
   obtaining, by the processor, a transaction data response from the mobile device;
   and receiving, by the processor, a transaction authorization notice from the issuer system, wherein the transaction authorization notice is based on the transaction authorization request generated by the remote EMV payment application.

2. The method of claim 1, wherein the merchant application is executed by a user device and the transaction request is transmitted to the processor from the user device.

3. The method of claim 1, wherein the remote EMV payment application processing the transaction request further comprises: performing cardholder verification, performing a card action analysis, processing transaction or account restrictions, performing merchant risk analysis and management, or performing a card action analysis.

4. The method of claim 1, further comprising transmitting, by the processor in electronic communication with a payment network, a transaction authorization request comprising the payment token, wherein in response to receiving the transaction authorization request the payment network is configured to at least one of authorize or settle the transaction.

5. The method of claim 1, wherein the remote EMV payment application is configured to process the transaction request by generating a payment cryptogram to be transmitted to the issuer system to authorize the transaction request.

6. A system comprising:
   a merchant system and payment application server each comprising: at least one processor, a tangible, non-transitory memory configured to communicate with a processor, the tangible, non-transitory memory having instructions stored thereon that, in response to execution by a processor, cause a processor to perform operations comprising:
   receiving, by the merchant system, from a merchant application, a transaction request comprising a payment token and an EMV payment application uniform resource identifier ("URI"), the EMV payment application URI comprising a string of characters identifying a storage location of a remote EMV payment application
   transmitting, by the merchant system in electronic communication with the payment application server the payment token and the EMV payment application URI to the payment application server, wherein the payment application server invokes the remote EMV payment application by extracting the storage location of the remote EMV payment application from the EMV payment application URI;
   wherein in response to being invoked, establishing, by the remote EMV payment application a cryptographically protected secure channel with a merchant system kernel to process the transaction request, and wherein in response to processing the transaction request
   transmitting, by the remote payment application server, a transaction authorization request comprising EMV transaction data directly to an issuer system, the EMV transaction data comprising a cryptogram for validation by the issuer system;
   and receiving, by the merchant system, a transaction authorization notice from the issuer system, wherein the transaction authorization notice is based on the transaction authorization request generated by the remote EMV payment application.

7. The system of claim 6, wherein the merchant application is executed by a user device and the transaction request is transmitted to the processor from the user device.

8. The system of claim 6, further comprising transmitting, by the merchant system, a transaction data request in response to the remote EMV payment application determining that additional data is needed to authorize the transaction request.

9. The system of claim 6, further comprising transmitting, by the processor in electronic communication with a payment network, a transaction authorization request comprising the payment token, wherein in response to receiving the transaction authorization request the payment network is configured to at least one of authorize or settle the transaction.

10. The system of claim 6, wherein the remote EMV payment application is configured to process the transaction request by generating a payment cryptogram to be transmitted to the issuer system to authorize the transaction request.

11. A non-transitory computer-readable medium embodying a program executable by at least two processors, the program, when executed, causing the processor to at least:

receive, by a first processor, a transaction request comprising a payment token and an EMV payment application uniform resource identifier ("URI") from a mobile device, wherein the transaction request is initiated by a merchant application in electronic communication with the first processor, wherein the transaction request comprises a payment token and an EMV payment application uniform resource identifier ("URI"), the EMV payment application URI comprising a string of characters identifying a storage location of the remote EMV payment application on a remote payment application server;

transmitting, by the first processor in electronic communication with a second processor the payment token and the EMV payment application URI to the second processor, wherein the second processor invokes the remote EMV payment application located at the EMV payment application URI;

wherein in response to being invoked, establishing, by the second processor a cryptographically protected secure channel with a merchant system kernel to process the transaction request;

receiving, by the first processor, from the second processor, a transaction data request for additional information to authorize the transaction request;

transmit, by the first processor, the transaction data request to the merchant application, the transaction data request comprising a request for a biometric input via the mobile device in response to a determination by the remote EMV payment application that additional information is required to authorize the transaction request;

obtain, by the first processor, a transaction data response from the mobile device;

and receive, by the second processor, a transaction authorization notice from the issuer system, wherein the transaction authorization notice is based on the transaction authorization request generated by the remote EMV payment application.

12. The non-transitory computer-readable medium of claim 11, wherein the establishing by the second processor further comprises: performing cardholder verification, performing a card action analysis, processing transaction or account restrictions, performing merchant risk analysis and management, or performing a card action analysis.

13. The non-transitory computer-readable medium of claim 11, wherein the merchant application is executed by a user device and the transaction request is transmitted to the first processor from the user device.

14. The non-transitory computer-readable medium of claim 11, wherein the program, when executed, causes the second processor to transmit a transaction data request in response to the remote EMV payment application determining that additional data is needed to authorize the transaction request.

15. The non-transitory computer-readable medium of claim 11, wherein the program, when executed, causes the second processor to transmit further a transaction authorization request comprising the payment token, wherein in response to receiving the transaction authorization request a payment network is configured to at least one of authorize or settle the transaction.

16. The non-transitory computer-readable medium of claim 11, wherein the remote EMV payment application is configured to process the transaction request by generating a payment cryptogram to be transmitted to the issuer system to authorize the transaction request.

* * * * *